Patented Dec. 16, 1952

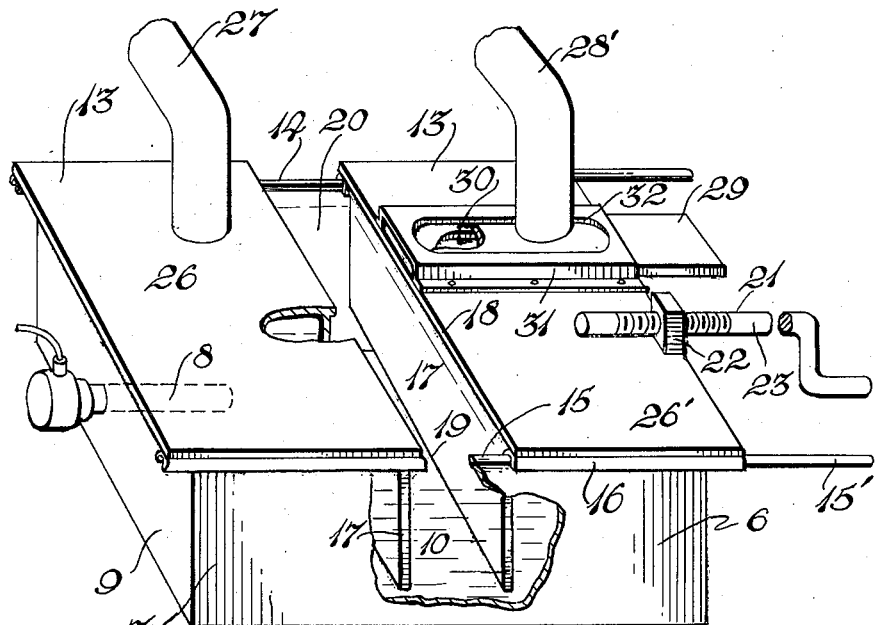
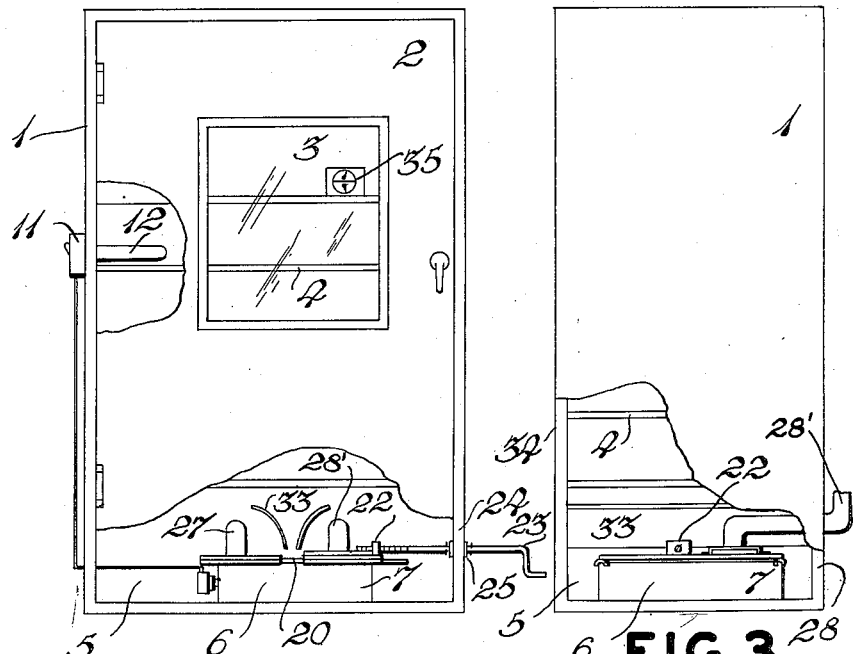

2,621,650

UNITED STATES PATENT OFFICE 2,621,650

PROOFER WARMING AND HUMIDIFYING UNIT

William John Pittendreigh, Hamiota, Manitoba, Canada

Application April 13, 1949, Serial No. 87,305

5 Claims. (Cl. 126—350)

My invention relates to new and useful improvements in proofing cabinets used in bakeries, an object of my invention being to provide a device of the character herewithin described whereby the temperature and relative humidity of the cabinet can be controlled within the ranges required for efficient bread manufacture.

A further object of my invention is to provide a device of the character herewithin described which is particularly suitable for use with relatively small proofing cabinets used by individual bakers and the like.

Another object of my invention is to provide a device of the character herewithin described which is economical in manufacture, simple in construction, and otherwise well suited for the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a perspective view of my device per se fragmented in parts to show the construction thereof.

Figure 2 is a front view of a proofer cabinet with my device in situ fragmented in parts to show the interior thereof.

Figure 3 is a side elevation of Figure 2.

In the drawings like characters of reference indicate corresponding parts in the different figures.

In quantitative bread manufacture it is necessary to store the bread dough for a given length of time under conditions of temperature and relative humidity in order that the dough may rise due to the re-action of the yeast contained therein. In order to obtain a consistant product after baking it is essential that the temperature and relative humidity during this rising process be maintained within very close limits. As an example, a temperature of 95° F. with a relative humidity of 83% may be taken as an average and the bread dough should remain under these conditions for a certain length of time.

In the baking industry the bread dough is stored in what are termed proofer cabinets and an endeavour is made to maintain the air within these cabinets at the desired condition. In relatively large bakeries this is accomplished by relatively expensive equipment impracticable for use with a small proofer cabinet. In small proofers, the normal method is to use a heated water bath located in the base thereof and it will be appreciated that if the humidity of the proofer reaches the desired figure before the correct temperature has been obtained it is extremely difficult to raise the temperature further without increasing the relative humidity.

Under these conditions it is almost impossible to obtain the proper timing of bread dough consequently the standard of quality suffers considerably. The warming and humidifying unit hereinafter to be described overcomes this difficulty by having means whereby the water surface area may be varied in order to obtain and maintain the desired humidity and which is extremely simple and economical to manufacture and install in existing proofer cabinets.

Proceeding therefore to describe my invention in detail it will be seen upon reference to the accompanying drawings that I have illustrated a conventional proofer cabinet 1 having a loading and unloading door 2, which in turn is provided with a glass inspection panel 3 through which the condition of the bread dough may be observed.

The proofer cabinet 1 is provided with shelves 4 upon which the bread dough may be stored and it is desirable that these shelves be perforated or louvred in order to permit efficient circulation of air therearound. A base compartment 5 is provided within the cabinet which holds my warming and humidifying unit collectively designated 6. This unit comprises a relatively shallow rectangular water tank 7 having a source of radiant thermal energy in the form of an immersion heater 8 extending through the end wall 9 thereof. The immersion heater 8 which extends into a body of water 10 contained within the tank 7, is controlled by means of switch 11 secured to one wall of the cabinet 1 and in this embodiment I have provided a thermostat 12 in order to provide an automatic action to the immersion heater 8.

A pair of horizontally slidable, substantially rectangular tank cover panels 13 are provided spanning the water tank 7 being supported by longitudinal edges 14 which may be rolled or provided with longitudinally extending round bars 15 as shown in Figure 1 of the accompanying drawings. In order to assist in the sliding movement of the panels 13 a longitudinally extending semicircular bearing portion 16 is secured to the underside of each panel engageable with the aforementioned bar 15.

A barrier panel 17 is connected along the upper edge thereof to one overlying edge 18 of each tank cover panel 13. These barrier panels span the tank 7 and depend from the tank cover panels into the body of water 10 but it should be appreciated that the lower edge 19 of the barrier panels is above the floor of the tank thus permitting circulation of the water therearound. From the foregoing it will be appreciated that the tank cover panels and barrier panels form an uncovered variable width trough 20 from which steam may enter the proofing cabinet 1, the volume being controlled by the width of trough 20.

The right hand tank cover panel with reference to the drawings, is provided with an adjustment device 21 comprising an upstanding screw-threaded lug 22 secured to the cover panel and a crank rod 23 screw-threaded at the inner end thereof which extends between lug 22 and the side 24 of the cabinet 1, washers and pins 25 preventing lengthwise movement of the rod. Rotation of the crank rod 23 causes the cover panel to move towards or away from its opposite member and in this connection it will be observed that I have provided outboard extensions 15' of the aforementioned round bars 15 in order to support the cover panels 13 when moved outwardly. In this embodiment I have provided an adjustment means on one cover panel only as it has been found that the opposite cover panel can be set in a given position during installation, the trough 20 being variable to supply the necessary volume of steam to the cabinet. If desired however the adjustment hereinbefore described can be fitted to both cover panels.

The left hand cover panel specifically designated 26 is provided with a stationary enclosed-vapour discharge duct 27 communicating with the interior of the water tank enclosed by cover panel 26 and its corresponding barrier panel 17. Duct 27 extends between the cover panel 26 and the rear panel 28 of the cabinet through which it passes and continues to a remote discharge point exteriorly of the building. This duct conveys away from the unit excess steam which forms under the tank cover panel 26. The movable cover panel 26' is also provided with a discharge duct 28' extending from the cover panel to the rear of the cabinet and to permit movement of the cover panel the duct 28' is attached to a stationary apron 29 which is apertured to enable the duct to communicate with the interior of the water tank by means of an elongated aperture 30 formed in the cover panel. An enclosing bracket 31 spans apron 29 being longitudinally slotted as at 32 to permit movement of the cover panel past duct 28'. From the foregoing it will be appreciated that the aperture 30 within the cover panel is at all times covered by apron 29 and that duct 28' is in communication with the interior of the water tank enclosed by this cover panel and its corresponding barrier panel 17.

In operation the immersion heater 8 raises the temperature of the body of water 10 which supplies heat to the proofer cabinet 1. Steam is formed upon the surface of the water 10 and a certain volume thereof is permitted to enter the proofer cabinet via the variable width trough 20, the volume being controlled by the width of the trough as hereinbefore described. When the temperature reaches the desired figure, thermostat 12 switches off the immersion heater 8 but steam is still permitted to enter the proofer until the desired relative humidity is obtained. At this point the cover panels are closed thus shutting off the trough 20 and preventing any further rise in humidity from occurring. The excess steam formed passes through ducts 27 and 28' to the exterior of the cabinet.

In order to obtain efficient circulation of the steam entering the cabinet from the trough 20, I have provided what I define as an overspanning vapour baffling assembly 33 comprising a pair of curved panels extending from the rear wall 28 to the front wall 34. Figures 2 and 3 of the accompanying drawings show the location of these panels, the concavity thereof deflecting the vapour to either side of the cabinet. A combined temperature and humidity gauge 35 is provided within the inspection panel 3 in order that the correct proofing temperature and humidity may be maintained.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A warming and humidifying unit for proofer cabinets and the like, said unit, comprising in combination a relatively shallow rectangular water holding tank, a source of radiant thermal energy in said tank, a pair of horizontal cover panels overlying said tank, a vertical barrier panel connected along the upper edge thereof to one overlying edge of each of said cover panels to depend therefrom into the body of water within said tank, at least one of said cover panels being slidable in its plane towards or away from the other together with the barrier panel connected thereto so as to provide an uncovered, variable width trough between said barrier panels from the water within which vapour may rise.

2. A warming and humidifying unit for proofer cabinets and the like, said unit, comprising in combination a relatively shallow rectangular water holding tank, a source of radiant thermal energy in said tank, a pair of horizontal cover panels overlying said tank, a vertical barrier panel connected along the upper edge thereof to one overlying edge of each of said cover panels to depend therefrom into the body of water within said tank, at least one of said cover panels being slidable in its plane towards or away from the other together with the barrier panel connected thereto so as to provide an uncovered, variable width trough between said barrier panel from the water within which vapour may rise, a stationary, vapour conducting discharge duct overlying said cover-panel and communicating therewith through an open mouth at one end thereof, an apron surrounding said mouth, said apron lying flush with and contiguous to said cover-panel, said cover-panel being longitudinally slotted in the region of said duct to allow for sliding movement therepast, said apron at all times covering said aperture.

3. A warming and humidifying unit for proofer cabinets and the like, said unit, comprising in combination a relatively shallow rectangular water holding tank, a source of radiant thermal energy in said tank, a pair of horizontal cover panels overlying said tank, a vertical barrier panel connected along the upper edge thereof to one overlying edge of each of said cover panels to depend therefrom into the body of water within said tank, at least one of said cover panels being slidable in its plane towards or away from the other together with the barrier panel connected thereto so as to provide an uncovered, variable width trough between said barrier panel from the water within which vapour may rise, and an over-spanning vapour baffling assembly for dividing the volume of vapour rising from said trough.

4. A warming and humidifying unit for proofer cabinets and the like, said unit, comprising in combination a relatively shallow rectangular water holding tank, a source of radiant thermal energy in said tank, said source of radiant thermal energy taking the form of an immersion heater, a pair of horizontal cover panels overlying said tank, a vertical barrier panel connected along the upper edge thereof to one overlying edge of each of said cover panels to depend therefrom into the body of water within said tank, said cover panels being slidable in their plane towards or away from each other together with the barrier panel connected thereto so as to provide an uncovered, variable width trough between said barrier panel from the water within which vapour may rise, a stationary vapour conducting discharge duct overlying each of said cover-panels and communicating therewith through an open mouth at one end thereof.

5. A warming and humidifying unit for proofer cabinets and the like, said unit, comprising in combination a relatively shallow rectangular water holding tank, a source of radiant thermal energy in said tank, said source of radiant thermal energy taking the form of an immersion heater, a pair of horizontal cover panels overlying said tank, a vertical barrier panel connected along the upper edge thereof to one overlying edge of each of said cover panels to depend therefrom into the body of water within said tank, said cover panels being slidable in their plane towards or away from each other together with the barrier panel connected thereto so as to provide an uncovered, variable width trough between said barrier panels from the water within which vapour may rise, a stationary vapour conducting discharge duct overlying each of said cover-panels and communicating therewith through an open mouth at one end thereof, and an over-spanning vapour baffling assembly for dividing the volume of vapour rising from said trough.

WILLIAM JOHN PITTENDREIGH.

REFERENCES CITED

The following references are of record in the file of this patent:

UNITED STATES PATENTS

| Number | Name | Date |
|---|---|---|
| 1,325,506 | Burkhardt | Dec. 23, 1919 |
| 1,421,425 | Duncan | July 4, 1922 |
| 1,555,321 | Woodson | Sept. 29, 1925 |
| 1,769,048 | Anetsberger, et al. | July 1, 1930 |
| 1,936,895 | Anetsburger, et al. | Nov. 28, 1933 |
| 2,469,778 | Morici | May 10, 1949 |
| 2,499,525 | Person | Mar. 7, 1950 |